A. BARTON.
Plow.
No. 15,321.
Patented July 15, 1856.
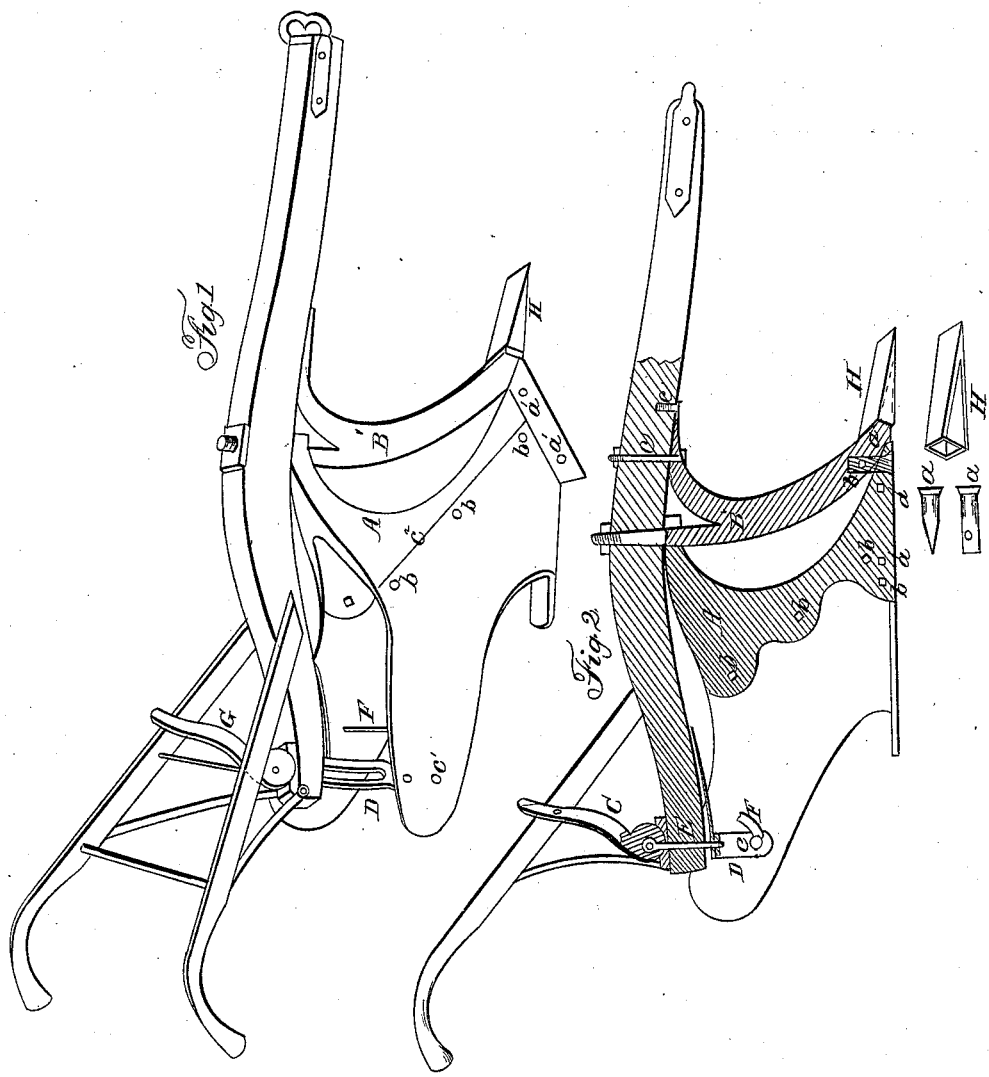

UNITED STATES PATENT OFFICE.

ALVIN BARTON, OF SYRACUSE, NEW YORK.

IMPROVEMENT IN PLOWS.

Specification forming part of Letters Patent No. 15,321, dated July 15, 1856.

*To all whom it may concern:*

Be it known that I, ALVIN BARTON, of Syracuse, in the county of Onondaga and State of New York, have invented a new and useful Improvement in Plows; and I do hereby declare that the following is a full and exact description thereof, reference being had to the accompanying drawings and the letters of reference marked thereon.

The nature of my invention consists in attaching the body of the plow to the colter in such a manner as to allow the body of the plow to be moved to the right or left for a side-hill plow or a reverse plow, and by confining the body to any desired angle with the beam by a cross-bar and cam-lever attached to the hind end of the beam of the plow, and also by forming the lower end of the colter into a wedge shape, on which to place and replace, at pleasure, a self-sharpening socket-point, which can be reversed at pleasure as it becomes worn, and easily replaced without heating or being taken out of the field. This point may be made of wrought or cast iron or steel, at pleasure.

To enable others skilled in the art to make and use my invention, I will proceed to describe its construction and operation.

I make the beam, handles, and draft-piece or clevis in any of the common forms. I make the body of the plow or frame-work, which I shall describe as Figure A, Plate 1, which I make to conform to the shape of the mold-boards on each side. The frame is formed at its lower end to receive the shares on each side; B, Plate 1, the share, fastened to the frame with two bolts, $a'$ $a'$. On each side of the frame is a rabbeted plane of two or more inches wide, the depth or thickness of the mold-board, and indicated by the line $c'$ from the share to the upper edge of the mold-board, which is attached to the frame A by three bolts. (Indicated by $b$ $b$ $b$, Plate 1, and the same letters on Plate Fig. 2 indicating the inside of the frame and nuts to the bolts $b$ $b$ $b$, Plate 1.) The mold-boards are supported in the rear by the cross-bar, which is bent downward at each end and bolted firmly to the mold-board; may be made of two and one-half by one-half inch iron, having a slot cut from end to end of the horizontal part (indicated by D) to allow the bolt E, Plate 2, to pass through, which, having a nut on its lower end and passing through the beam and attached to the cam-lever G by a pin or bolt, serves to confine the beam at any desired point. The rod F, Plate 1, is made of three-fourths-inch round iron, with each end plated, and a hole made and each end so bent to let the bolt $c$ pass through it, which serves as a brace to support the lower back part of the mold-board.

I make the colter B' in the common way or form of a wrought-iron colter, with the exception of the ends. The lower end I form into a wedge shape of sufficient size for strength, and punch a slot or mortise in the back edge to receive the wedge shaped pivot-bolt, (indicated at $a$ $a$ $a$, Plate Fig. 2,) by which the lower point of the frame of the plow is attached and held firmly to the colter, the pivot-bolt being held in place by the pin or bolt. (Indicated at $b$, Fig. 2.) The upper end of the colter is split and opened about seven or eight inches, the back part left round, one inch or more formed into a bolt, which passes through the upper front part of the body of the plow, forming a joint with the bolt $a$ at the lower front point, which allows the body of the plow to vibrate to the right or left, the bolt passing through the beam of the plow and secured by a nut on top. The front part, after splitting, is flattened down and carried forward under the beam, and secured by a bolt or bolts, as indicated by $c$ $c$, Fig. 2.

I claim—

Jointing the upper and front points of the body of the plow to the colter, the whole being arranged and operated substantially in the manner and for the purpose set forth.

ALVIN BARTON.

Witnesses:
R. F. STEVENS,
W. C. HENDRICKS.